United States Patent [19]

Bustos

[11] Patent Number: 5,435,833
[45] Date of Patent: Jul. 25, 1995

[54] PROCESS TO CONVERT NON-FERROUS METAL SUCH AS COPPER OR NICKEL BY OXYGEN ENRICHMENT

[75] Inventor: Alejandro A. Bustos, Montreal, Canada

[73] Assignee: L'Air Liquide, Societe Anonyme Pour L'Etude Et L'Exploitation Des Procedes Georges Claude, Paris, France

[21] Appl. No.: 129,321

[22] Filed: Sep. 30, 1993

[51] Int. Cl.6 ............................................. C22B 15/00
[52] U.S. Cl. ......................................... 75/643; 75/508
[58] Field of Search ................................... 75/643, 508

[56] References Cited

U.S. PATENT DOCUMENTS

| | | | |
|---|---|---|---|
| Re. 32,234 | 8/1986 | Brimacombe et al. | 75/629 |
| 3,281,236 | 10/1966 | Meissner | 75/643 |
| 3,432,289 | 3/1969 | Spitz | 75/643 |
| 3,844,768 | 10/1974 | Leroy | 75/508 |
| 4,238,228 | 12/1980 | Brimacombe et al. | 75/629 |
| 4,599,108 | 7/1986 | Hanniala | 75/643 |

Primary Examiner—Peter D. Rosenberg
Attorney, Agent, or Firm—Burns, Doane, Swecker & Mathis

[57] ABSTRACT

A process for converting a copper or nickel matte comprising at least 30% by weight of a copper or nickel based material and a substantial weight amount of an iron based material as one of the impurities to be removed from the matte by oxidation in a converter wherein during a first step of said process substantially all of the iron based material is oxidized with an oxygen comprising gas to make ferrous oxide which is thereafter transformed into slag by addition of a solid material to the molten metal and during a second step of said process, the copper based material is oxidized with said oxygen comprising gas to generate substantially pure copper and residues, said residues being essentially in gaseous form, the oxygen comprising gas being injected through an internal injector of a concentric shrouded tuyere comprising the internal injector and an external injector concentrically disposed around said internal injector with a gas passage therebetween, a shrouding substantially inert gas being injected through said gas passage with such flow rate and pressure that between about 5% to about 25% of the heat generated by the exothermic reaction of the oxygen with the copper matte substantially throughout the duration of the process is absorbed by the inert gas flowing through the gas passage.

60 Claims, No Drawings

PROCESS TO CONVERT NON-FERROUS METAL SUCH AS COPPER OR NICKEL BY OXYGEN ENRICHMENT

BACKGROUND OF THE INVENTION

The invention relates to a process to convert copper or nickel mattes into substantially pure metal by blowing oxygen-enriched air into a bath of molten metal. This type of process is usually carried out in a side blown converter such as a Peirce-Smith converter wherein oxygen-enriched air is injected through 20 to 50 single pipe tuyeres, having a diameter between 25 to 50 mm located along the axis of the reactor more or less in a horizontal position. Usually, oxygen is added to the pure air to a maximum enrichment level of less than 30% oxygen in air. Above this level of enrichment, the refractory wear at the tuyere line becomes excessive.

In 1988, a survey of world copper smelters indicated that of 41 smelters using 134 converters, 15 of them used oxygen enrichment of the blast either occasionally or on a regular basis. The maximum reported enrichment level was 28% oxygen.

It is well known by the man skilled in the art that when air comprising about 30% oxygen or more, is injected in a copper converter, the refractory wear at the tuyere tip line becomes excessive. This deterioration has been explained in an article entitled "Accretion Growth at the Tuyeres of a Peirce-Smith Copper Converter" by A. A. Bustos et al., the Centre of Metallurgical Process Engineering, the University of British Columbia, as published in Canadian Metallurgical Quarterly, Vol. 27, No. 1, pp. 7-21, 1988, Canadian Institute of Mining and Metallurgy, Pergamon Press plc.

In this article is disclosed a mathematical model predicting the size and shape of accretions produced during converting. The results from this model which agree well with industrial experience, indicate that 36% oxygen enrichment level is the maximum theoretical limit compatible with the formation of a protective layer of solid material around the periphery of the tuyere refractory, as explained in said article. Thereafter, the tuyere line is unprotected, which is detrimental to refractory life.

However, in order to avoid the destruction of the refractory lining, as explained hereabove, the industry using copper enrichment converters has not processed an enrichment of more than 28% of oxygen through the air injected through the converter.

U.S. Pat. No. 3,990,899 discloses a converting process for the extraction of heavy non-ferrous metals from their ores, such as copper, nickel, cobalt or lead sulfides.

The conversion is carried out by injecting oxygen of industrial purity (which means oxygen produced cryogenically from air, i.e., having a purity of about 99.9% vol. $O_2$—at least) through the bath of molten metal to make the conversion from ore to pure metal with the formation of, e.g., some slag. The refractory lining in the vicinity of the tuyere output is protected by injecting a shielding hydrocarbon or sulfur dioxide or water. To protect the injectors and refractory lining, a shielding fluid such as sulfur dioxide is injected in the molten bath until the sulfur content of the molten bath is about less than 5%, at which time the sulfur dioxide is replaced with hydrocarbon gas. The injection of both $SO_2$ and hydrocarbon gas, which might generate CO at high temperature, because those two gases are reactive with oxygen, is an environmental issue today.

U.S. Pat. No. 3,990,890 relates to refining molten copper matte with an enriched oxygen blow. This process comprises two phases: during a first phase of the refining, the oxygen content of the oxidizing gas at a pressure in the range of 6 to 20 bar is varied as necessary up to pure oxygen to maintain the temperature of the matte in the range of 1280° C. to 1420° C. and still promote sufficient stirring of the molten bath by the injected oxidizing gas highly enriched with oxygen for a second phase of the refining while still maintaining the temperature in the aforementioned range by adjusting the oxygen content of the oxidizing gas. By injecting a cooling agent, which is a carbon containing material, while blowing the oxidizing gas at much higher pressure than those used before, the oxygen content of the oxidizing gas can be increased far beyond the limits previously imposed in copper matte conversion processes. This high pressure oxygen containing gas expands in the tuyere, due to its high pressure, which creates a cooling effect of the tuyere, but this cooling effect might sometimes be too strong and reinforce the clogging effect (mushroom creation) that this process is supposed to reduce.

U.S. Pat. No. 4,023,781 discloses a tuyere made of three concentric pipes for refining metal in molten stat by injection of oxygen in the central tuyere while protective medium are injected in the outside tuyeres. These tuyeres are individually movable longitudinally into the vessel in order to avoid their premature replacement.

U.S. Pat. No. 4,657,586 discloses copper refining by submerged injection of oxygen and fuel in a concentric tuyere wherein between at least 100% and not more than 150% of the oxygen required for complete conversion of the injected fuel is injected (which means between 66% to 100% of fuel compared to the stoichiometric quantity of oxygen needed for complete combustion of said fuel). Most of the oxygen is thus for the purpose of combusting the fuel to create heat in the molten bath which comprises oxygen containing impurities. It is also disclosed a process wherein the amount of oxygen might be less than that required for complete combustion with the fuel which means that the process disclosed in this patent does not need oxygen injection for the purpose of refining copper.

U.S. Pat. No. 3,844,768 relates to refining of alloy steels, not to copper or nickel refining. In the steel making industry, it is known, as disclosed in said patent, to use argon (in the so-called AOD process) for decarburization of pig iron, including oxygen and argon mixtures or argon in a shrouding tuyere comprising an inner tuyere wherein oxygen is injected through the molten metal. This type of double tuyere with argon-oxygen injection is disclosed in said patent as being inefficient and there is a strong suggestion of using a double or triple feed tuyere with a peripheral flow of carbon make-up liquid.

SUMMARY OF THE INVENTION

There are presently incentives for using oxygen-enriched air in non-ferrous converters but there is presently no efficient and economical process available on the market for that purpose. Among these incentives are heat conservation in the charge to melt cold materials, increase of converter capacity and productivity and increase of the off-gas strength.

It is an aim of the present invention to provide a new process for non-ferrous material conversion, including copper and nickel which allows the use of an oxygen comprising gas which comprises more than about 30% volume of oxygen gas without unacceptable wear of the gas injectors and the refractory lining of the converter, surrounding the injectors.

According to the invention, there is provided a process for converting a copper or nickel matte comprising at least 30% by weight of a copper or nickel based material and a substantial weight amount of an iron based material as one of the impurities to be removed from the matte by oxidation in a converter wherein during a first step of said process substantially all of the iron based material is oxidized with an oxygen comprising gas to make ferrous oxide which is thereafter transformed into slag by addition of a solid material to the molten metal and during a second step of said process, the copper based material is oxidized with said oxygen comprising gas to generate substantially pure copper and residues, said residues being essentially in gaseous form, the oxygen comprising gas being injected through an internal injector of a concentric shrouded tuyere comprising the internal injector and an external injector concentrically arranged around said internal injector with a gas passage therebetween, a shrouding substantially inert gas being injected through said gas passage with such flow rate and pressure that between about 5% to about 25% of the heat generated by the exothermic reaction of the oxygen with the copper matte substantially throughout the duration of the process is absorbed by the inert gas flowing through the gas passage.

The essence of the invention is to inject through a concentric tuyere oxygen-enriched air comprising preferably between about 30% and 60% volume of oxygen and at the same time injecting an inert gas as a shielding gas in order to absorb some of the additional heat generated by the additional oxygen, but only in the vicinity of the tuyere to avoid overheating of the tuyere and premature destruction of the refractory lining surrounding the tuyere. The concentric tuyere system is disclosed e.g. in French Patent 1,458,718 (Savard & Lee) incorporated herein as a reference.

According to a preferred embodiment of the invention, the inert gas, e.g. nitrogen gas, is injected at a pressure which is higher than the pressure of the oxygen-enriched air.

By using an inert gas at a higher pressure than the oxygen-enriched air, and preferably an inert gas having a pressure which is 0.5 bar (or more) higher than that of oxidizing gas, the reaction of between oxygen and oxidizable species in the non-ferrous molten material (which is exothermic) takes place at some distance of the tip of the tuyere which allows to avoid overheating of the tuyere and of the refractory lining surrounding the tuyere.

According to a preferred embodiment of the invention, inert gas flow rate and pressure are such that about 5% to about 15% and more preferably about 10% of the heat generated by the exothermic reaction of $O_2$ is absorbed by the substantially inert gas.

The inert gas is preferably nitrogen which is inexpensive and has an adequate heat capacity. However, the inert gas can also be sometimes $CO_2$ and will be more generally selected from the group consisting of $N_2$, $CO_2$, argon, neon, krypton, xenon, or any mixture thereof.

This inert gas is not however necessarily pure inert gas, but generally comprises an inert gas mixed with another gas. While in the case of nitrogen, air which comprises about 79% volume of nitrogen is generally not adequate (because of its too high content of residual oxygen), a gas mixture comprising about 90% of inert gas such as nitrogen or the like is usually adequate. This inert gas (mixture) can be obtained from cryogenically distilled air (which means a gas industrially pure, i.e. containing more than 99.99% vol. of $N_2$) and injected as such (preferably in gaseous form and preferably at least at ambient temperature) or mixed with a certain quantity of pressurized air to achieve the above limit. This nitrogen gas comprising more than about 90% of nitrogen ("impure" nitrogen) also can be obtained from e.g. a nitrogen membrane generator or a nitrogen Pressure Swing Adsorption (PSA) system or a nitrogen Vacuum Swing Adsorption (VSA) system at adequate pressure.

If liquid nitrogen is used, it should be, of course, usually vaporized before injection through the tuyere and even preheated at a temperature which does not increase the accretion problem (the clogging of the tuyere) but keep the cooling effect of the nitrogen gas.

This vaporization and/or preheating are preferably carried out by heat exchange with the molten metal, somewhere in the plant where the heat generated by the molten metal can be easily used to heat the gas.

While the difference of pressures between the inert gas and the oxygen containing gas is usually a least about 0.5 bar, it is preferred that the pressure of the inert gas is comprised between about 3 bar and about 6.5 bar absolute. The pressure of the inert gas, e.g. nitrogen, can be sometimes substantially higher than that of the oxygen gas, not only to reduce wear of the tuyere and the refractory linings as explained above, but also to provide an inert gas in the so-called "jetting" regime, which substantially reduces the clogging of the tuyere, which allows to avoid any punching operation in the tuyere (which problem is disclosed in the article of Brimacombe et al. entitled "Toward a Basic Understanding of Injection in the Copper Convert", Metallurgical Society of AIME, Feb. 1985).

According to another embodiment of the invention, the oxygen comprising gas comprises more than about 30% volume of oxygen gas, and preferably between about 40% volume to about 60% volume of $O_2$.

According to another preferred embodiment of the invention, the pressure of the oxygen containing gas is comprised between about 3 and 6 bar.

While a higher pressure of oxygen containing gas might sometimes help for reducing clogging of the tuyere (injection under jetting conditions), this is usually not necessary because the injection of nitrogen at higher pressure is usually sufficient to reduce or avoid the punching of the tuyere.

The oxygen gas is either liquid oxygen, vaporized and even heated in a heat exchanger (and preferably in heat exchange with the molten metal when the gas is heated or preheated) or gaseous oxygen (which can be preheated too). Gaseous oxygen can be provided, e.g. from an oxygen PSA or VSA generator. Also, under certain conditions, both the product and the residue gas of membrane generators or PSA or VSA generators can be used simultaneously. For example, when an $O_2$ PSA (or VSA) generator is used to enrich the air compressed and injected in the inner tuyere (the mixing of the gases being made before air compression if the $O_2$ pressure is too low or after compression if it is high enough(), the residue gas of the generator (which is usually vented) has usually a concentration in nitrogen which is high enough to be injected as such (sometimes after compression) as the inert gas in the outer tuyere or mixed with another source of nitrogen to be injected in said outer tuyere. Similarly, a nitrogen membrane generator or a nitrogen PSA or VSA can be used as the nitrogen source (mixed or not with air) for the outer tuyere while the residue gas of this generator which is enriched in $O_2$ is used either as such (usually after recompression) or mixed with another source of oxygen to feed the inner tuyere.

Among the advantages of the process is the possible recovery of off-gases from the converter to produce sulfuric acid when the matte (particularly copper matte) converted is rich in sulfur.

When air comprising up to 28%–30% vol. $O_2$ is used for example, in a Peirce-Smith converter with a copper matte (which comprises sulfur), the off-gases usually comprise about 3% vol. of $SO_2$. While this is a source of pollution which means that these off-gases need to be treated before being vented, there is not enough $SO_2$ in these off-gases to transform them into sulfuric acid at a low production cost. Sulfuric acid products usually use gases containing at least 8% of $SO_2$. When using oxygen-enriched air and depending on the sulfur content in the molten bath, it is possible to obtain off-gases containing more than 8% vol. of $SO_2$, and preferably between 8% and 12% vol.

Also, the invention makes it possible to use more scrap material, because there is more heat available due to a higher oxygen concentration. It is also possible, on the contrary, to reduce the number of tuyeres in the converter thus reducing the cost. (The material of the tuyere must be, of course, adapted to the slag composition to avoid corrosion, premature destruction or wear). When using the same number of tuyeres (or sometimes even less) as compared with air injection, the temperature of the molten metal, particularly at the end of the heat is higher (e.g. 1200° C. compared to 1100° C.). Accordingly, more impurities such as metallic impurities comprising As, Sb, Bi or the like can be eliminated in the vent gases, which means that the metal obtained according to the process of the invention is more pure.

EXAMPLE

A matte composition comprising about 45% Cu, 16% S, 8% Fe, a high content of Pb and slight amounts of Ni, Zn and As was used for carrying out this example. Oxygen-enriched air (comprising 50% $O_2$) has been used as the oxidizing gas, injected in the inner tuyere at a pressure of about 4 bar while nitrogen at a pressure of about 5 bar was injected in the outer tuyere.

The pressure of nitrogen (and of oxygen, also) was enough to generate a jetting injection regime. There was no clogging of the tuyere throughout the entire conversion process (approximately one hour). The temperature of the molten metal rapidly reached about 1200° C. which is about 100° C. higher than with air blowing.

Several blows (more than 5) were accomplished and the tuyeres (injectors) cooled with nitrogen remained intact (no erosion and the refractory linings were not damaged). No punching has been necessary.

By comparison and in the same condition, but injecting air (about 25% $O_2$) in single injectors, each injector has to be replaced at the end of every converting cycle and punching (usually manually) is necessary from time to time.

The blowing rate according to the invention is also greatly reduced (about 50%) which means energy savings and less splashing risks (in case of air injection, 75% of the gas injected is not useful—$N_2$ in air—while in the case of the invention only about 50% of the gas injected in the inner tuyere is nitrogen, while the peripheral injection of nitrogen is much less than the difference).

I claim:

1. A process for converting a copper or nickel matte comprising at least 30% by weight of a copper or nickel based material and further comprising an impurity amount of iron based material, said process comprising transforming the iron based material to slag by oxidizing substantially all of the iron based material using an oxygen containing gas to produce a ferrous oxide containing molten metal and adding to the molten metal a solid material effective to form the slag, said process further comprising generating substantially pure copper or nickel and residues by oxidizing the copper or nickel based material using an oxygen containing gas by injecting said oxygen containing gas through an internal injector of a concentric shrouded tuyere having an internal injector and an external injector concentrically disposed around said internal injector and having a gas passage therebetween where a shrouding substantially inert gas is passed at a flow rate and pressure effective to absorb from about 5% to about 25% of the heat generated by the exothermic reaction of oxygen with the copper or nickel based material substantially throughout the duration of the process.

2. A process for converting a copper or nickel matte comprising at least 30% by weight of a copper or nickel based material and further comprising an impurity amount of iron based material, said process comprising transforming the iron based material to slag by oxidizing substantially all of the iron based material using an oxygen containing gas to produce a ferrous oxide containing molten metal and adding to the molten metal a solid material effective to form the slag, said process further comprising generating substantially pure copper or nickel and residues by oxidizing the copper or nickel based material using an oxygen containing gas by injecting said oxygen containing gas through an internal injector of a concentric shrouded tuyere having an internal injector and an external injector concentrically disposed around said internal injector and having a gas passage therebetween where a shrouding substantially inert nitrogen containing gas is passed at a flow rate and pressure effective to absorb from about 5% to about 25% of the heat generated by the exothermic reaction of oxygen with the copper or nickel based material substantially throughout the duration of the process, and wherein at least a portion of the oxygen used to oxidize the copper or nickel based material and at least a portion of the nitrogen for the nitrogen-containing inert gas are generated from the same nitrogen generator which produces a nitrogen enriched product and an oxygen enriched residue, or from the same oxygen generator which produces an oxygen enriched product and a residue rich in nitrogen.

3. A process for refining a molten metal which comprises an impurity amount of an oxidisable impurity, through an exothermic reaction with oxygen, said process comprising transforming the oxidisable impurity to slag by oxidizing substantially all of the impurity using an oxygen containing gas to produce an oxide containing molten metal and adding to the molten metal a solid material effective to form the slag, said process further comprising generating substantially pure metal and residues by oxidizing the molten metal using an oxygen containing gas by injecting said oxygen containing gas through an internal injector of a concentric shrouded tuyere having an internal injector and an external injector concentrically disposed around said internal injector and having a gas passage therebetween where a shrouding substantially inert nitrogen containing gas is passed at a flow rate and pressure effective to absorb from about 5% to about 25% of the heat generated by the exothermic reaction of oxygen with the molten metal substantially throughout the duration of the process, and wherein at least a portion of the oxygen used to oxidize the molten metal and at least a portion of the nitrogen for the nitrogen-containing inert gas are generated from the same nitrogen generator which produces a nitrogen enriched product and an oxygen enriched residue, or from the same oxygen generator which produces an oxygen enriched product and a residue rich in nitrogen.

4. A process according to claim 1, wherein the inert gas flow rate and pressure are such that about 5% to about 15% of the heat generated by the exothermic reaction of $O_2$ is absorbed by the substantially inert gas.

5. A process according to claim 4, wherein the inert gas flow rate and pressure are such that about 10% of the heat generated by the exothermic reaction of $O_2$ is absorbed by the substantially inert gas.

6. A process according to claim 1, wherein the inert gas is selected from the group consisting of $N_2$, $CO_2$, Argon, Neon, Krypton, Xenon, or any mixture thereof.

7. A process according to claim 1, wherein the oxygen comprising gas comprises more than about 30% volume of oxygen gas.

8. A process according to claim 7, wherein the oxygen comprising gas comprises between about 40% volume to about 60% volume of $O_2$.

9. A process according to claim 1 wherein the temperature of the substantially insert gas injected to the entrance of the gas passage is colder than or substantially at the ambient temperature.

10. A process according to claim 1, wherein the substantially inert gas is preheated before entering the gas passage.

11. A process according to claim 9, wherein said inert gas is stored as a liquid in a vessel and is vaporized before being injected in the gas passage.

12. A process according to claim 10, wherein said inert gas is stored as a liquid in a vessel and is vaporized before being injected in the gas passage.

13. A process according to claim 11, wherein the liquid inert gas is vaporized by heat exchange with the molten metal in the converter.

14. A process according to claim 9, wherein the inert gas is nitrogen from a nitrogen-membrane generator comprising at least 90% $N_2$.

15. A process according to claim 10, wherein the inert gas is nitrogen from a nitrogen-membrane generator comprising at least 90% $N_2$.

16. A process according to claim 9, wherein the inert gas is a mixture of air and substantially pure nitrogen.

17. A process according to claim 10, wherein the inert gas is a mixture of air and substantially pure nitrogen.

18. A process according to claim 1, wherein the inert gas injected in the gas passage comprises compressed air.

19. A process according to claim 1, wherein the pressure of the inert gas injected in the gas passage is greater than the pressure of the oxygen containing gas.

20. A process according to claim 19, wherein the difference of pressure between the inert gas and the oxygen containing gas is at least about 0.5 bar.

21. A process according to claim 1, wherein the pressure of the inert gas is comprised between about 3 bar and about 6.5 bar absolute.

22. A process according to claim 1, wherein the pressure of the oxygen containing gas is comprised between about 3 and 6 bar.

23. A process according to claim 22, wherein the pressure of the inert gas is greater than the pressure of the oxygen containing gas, the pressure difference between the two gases being at least 0.5 bar.

24. A process according to claim 1, wherein the vent gas from the converter comprises $SO_2$ which is recovered and transformed into sulfuric acid.

25. A process according to claim 22, wherein the vent gas comprises between about 8% volume to about 12% volume of $SO_2$.

26. A process according to claim 1, wherein scrap copper or nickel based materials are added to the molten metal in the converter.

27. A process according to claim 1, wherein oxygen concentration in the oxygen containing gas is such that the temperature of the molten metal at the end of the blow is high enough to allow elimination in the vent gas of substantially all of at least one metal selected from the group comprising As, Sb or Bi when at least one of these metals are present in the molten metal.

28. A process according to claim 1, wherein the pressure of the inert gas is such that said gas is injected under jetting regime, thus substantially avoiding any punching operation through the tuyere.

29. A process according to claim 7, wherein the oxygen comprising gas is generated from air by a Pressure Swing Adsorption (PSA) or a Vacuum Swing Adsorption (VSA) generator.

30. A process according to claim 8, wherein the oxygen comprising gas is generated from air by a Pressure Swing Adsorption (PSA) or a Vacuum Swing Adsorption (VSA) generator.

31. A process according to claim 1, wherein the substantially inert gas comprises at least 90% vol. of inert gas.

32. A process according to claim 1, wherein the substantially inert gas is generated by a nitrogen PSA or a nitrogen VSA delivering a gas mixture comprising at least 90% of nitrogen.

33. A process according to claim 1, wherein the flow of oxygen and nitrogen are coming at least partially from the same generator.

34. A process according to claim 29, wherein said generator is an oxygen PSA or VSA which oxygen flow is at least partially injected in the inner tuyere and which vent gas flow is at least partially injected in the outer tuyere as the cooling gas.

35. A process according to claim 30, wherein said generator is a nitrogen PSA or VSA which nitrogen flow is at least partially injected in the outer tuyere as the cooling gas and which vent gas is at least partially injected in the inner tuyere as the oxygen containing gas.

36. A process according to claim 3, wherein the inert gas flow rate and pressure are such that about 5% to about 15% of the heat generated by the exothermic reaction of $O_2$ is absorbed by the nitrogen-containing substantially inert gas.

37. A process according to claim 36, wherein the inert gas flow rate and pressure are such that about 10% of the heat generated by the exothermic reaction of $O_2$ is absorbed by the nitrogen-containing substantially inert gas.

38. A process according to claim 3, wherein the oxygen-containing gas comprises more than about 30% volume of oxygen gas.

39. A process according to claim 38, wherein the oxygen-containing gas comprises between about 40% volume to about 60% volume of $O_2$.

40. A process according to claim 3, wherein the temperature of the nitrogen-containing substantially inert gas injected at the entrance of the gas passage is colder than, or substantially the same as, the ambient temperature.

41. A process according to claim 3, wherein the nitrogen-containing substantially inert gas is preheated before entering the gas passage.

42. A process according to claim 40, wherein the nitrogen-containing inert gas is stored as a liquid in a vessel, and is vaporized before being injected in the gas passage.

43. A process according to claim 41, wherein the nitrogen-containing inert gas is stored as a liquid in a vessel, and is vaporized before being injected in the gas passage.

44. A process according to claim 42, wherein the liquid inert gas is vaporized by heat exchange with the molten metal in the converter.

45. A process according to claim 40, wherein the inert gas is nitrogen from a nitrogen-membrane generator comprising at least 90% $N_2$.

46. A process according to claim 41, wherein the inert gas is nitrogen from a nitrogen-membrane generator comprising at least 90% $N_2$.

47. A process according to claim 40, wherein the nitrogen-containing inert gas is a mixture of air and substantially pure nitrogen.

48. A process according to claim 41, wherein the nitrogen-containing inert gas is a mixture of air and substantially pure nitrogen.

49. A process according to claim 3, wherein the pressure of the nitrogen-containing inert gas injected in the gas passage, is greater than the pressure of the oxygen-containing gas.

50. A process according to claim 49, wherein the pressure difference between the nitrogen-containing inert gas and the oxygen-containing gas is at least about 0.5 bar.

51. A process according to claim 3, wherein the pressure of the nitrogen-containing inert gas is between about 3 bar and about 6.5 bar absolute.

52. A process according to claim 3, wherein the pressure of the oxygen-containing gas is between about 3 and 6 bar.

53. A process according to claim 52, wherein the pressure of the nitrogen-containing inert gas is greater than the pressure of the oxygen-containing gas, the pressure difference between the two gases being at least 0.5 bar.

54. A process according to claim 3, wherein the pressure of the inert gas is such that said gas is injected under jetting regime, thus substantially avoiding any punching operation through the tuyere.

55. A process according to claim 38, wherein the oxygen-containing gas is generated from air by a Pressure Swing Adsorption (PSA) or a Vacuum Swing Adsorption (VSA) generator.

56. A process according to claim 39, wherein at least a portion of the oxygen-containing gas is generated from air by a Pressure Swing Adsorption (PSA) or a Vacuum Swing Adsorption (VSA) generator.

57. A process according to claim 3, wherein the nitrogen-containing substantially inert gas comprises at least 90% vol. of inert gas.

58. A process according to claim 3, wherein at least a portion of the nitrogen-containing substantially inert gas is generated by a nitrogen PSA or a nitrogen VSA generator delivering a gas mixture comprising at least 90% of nitrogen.

59. A process according to claim 55, wherein said generator is an oxygen PSA or VSA which oxygen flow is at least partially injected in the inner tuyere, and wherein at least a portion of vent gas flow is injected in the outer tuyere.

60. A process according to claim 56, wherein said generator is a nitrogen PSA or VSA and wherein nitrogen flow is injected in the outer tuyere as cooling gas, and wherein at least a portion of vent gas is injected in the inner tuyere.

* * * * *